United States Patent
Ignor et al.

(10) Patent No.: US 8,819,576 B2
(45) Date of Patent: Aug. 26, 2014

(54) SYSTEMS AND METHODS FOR FACILITATING AN INPUT TO AN ELECTRONIC DEVICE

(75) Inventors: Matthew Michael Ignor, Stratford (CA); Simon Edward Coulson, Hamilton (CA)

(73) Assignee: BlackBerry Limited, Waterloo, Ontario ( * ) Notice: Subject to any disclaimer, the term of this patent is extended or adjusted under 35 U.S.C. 154(b) by 376 days.

(21) Appl. No.: 13/103,359

(22) Filed: May 9, 2011

(65) Prior Publication Data

US 2012/0290965 A1 Nov. 15, 2012

(51) Int. Cl.
*G06F 3/048* (2013.01)
*G06F 1/16* (2006.01)

(52) U.S. Cl.
CPC .................................. *G06F 1/1626* (2013.01)
USPC ........................... 715/779; 715/778; 715/777

(58) Field of Classification Search
CPC .................................................... G06F 1/1626
USPC ................... 715/744, 740, 764; 345/173, 168
See application file for complete search history.

(56) References Cited

U.S. PATENT DOCUMENTS

| | | | |
|---|---|---|---|
| 6,577,496 B1 * | 6/2003 | Gioscia et al. | 361/679.3 |
| 6,966,837 B1 * | 11/2005 | Best | 463/33 |
| 7,076,267 B2 | 7/2006 | Vander Veen et al. | |
| 7,371,163 B1 * | 5/2008 | Best | 463/1 |
| 7,374,490 B2 * | 5/2008 | Tahara et al. | 463/43 |
| 7,400,908 B2 * | 7/2008 | Lehtonen | 455/566 |
| 7,791,594 B2 * | 9/2010 | Dunko | 345/173 |
| 7,880,724 B2 * | 2/2011 | Nguyen et al. | 345/168 |
| 8,468,460 B2 * | 6/2013 | Mysliwy et al. | 715/764 |
| 2005/0020325 A1 * | 1/2005 | Enger et al. | 455/575.3 |
| 2008/0059888 A1 * | 3/2008 | Dunko | 715/744 |
| 2008/0174570 A1 * | 7/2008 | Jobs et al. | 345/173 |
| 2008/0209442 A1 * | 8/2008 | Setlur et al. | 719/318 |
| 2009/0146908 A1 | 6/2009 | LeJeune et al. | |
| 2009/0172530 A1 * | 7/2009 | Chang | 715/700 |
| 2009/0222748 A1 | 9/2009 | Lejeune et al. | |
| 2009/0303204 A1 | 12/2009 | Nasiri et al. | |
| 2010/0029242 A1 | 2/2010 | Orr et al. | |
| 2010/0100839 A1 | 4/2010 | Tseng et al. | |
| 2010/0164836 A1 * | 7/2010 | Liberatore | 345/1.1 |
| 2010/0169790 A1 * | 7/2010 | Vaughan et al. | 715/740 |
| 2011/0060988 A1 * | 3/2011 | Mysliwy et al. | 715/702 |

FOREIGN PATENT DOCUMENTS

WO 2006123211 11/2006

OTHER PUBLICATIONS

European Patent Office, "Extended European Search Report," issued in connection with European application serial No. 11165349.9, issued Oct. 25, 2011, 8 pages.

Bright Hub, "iPhone Auto Lock Settings," retrieved from http://www.brighthub.com/mobile/iphone/articles/50555.aspx , published Sep. 28, 2009, 3 pages.

(Continued)

*Primary Examiner* — William Titcomb

(74) *Attorney, Agent, or Firm* — Hanley, Flight & Zimmerman, LLC.

(57) ABSTRACT

Systems and methods for facilitating an input to an electronic device are described herein. An example method for facilitating an input field of an electronic device includes presenting a menu item for selection while the electronic device is in a first physical state and identifying the menu item selected when the electronic device is in the first physical state. The method includes detecting whether the electronic device is in a second physical state after selection of the menu item and presenting an input field associated with the menu item selected.

34 Claims, 10 Drawing Sheets

(56) References Cited

OTHER PUBLICATIONS

European Patent Office, "Exam Report," issued in connection with European Patent Application No. 11 165 349.9, Jun. 24, 2013, 5 pages.

European Patent Office, "Exam Report," issued in connection with European Patent Application No. 11 165 349.9, Nov. 28, 2013, 7 pages.

Canadian Intellectual Property Office, "Office Action," issued in connection with Canadian Patent Application No. 2,774,352, Jan. 28, 2014, 3 pages.

\* cited by examiner

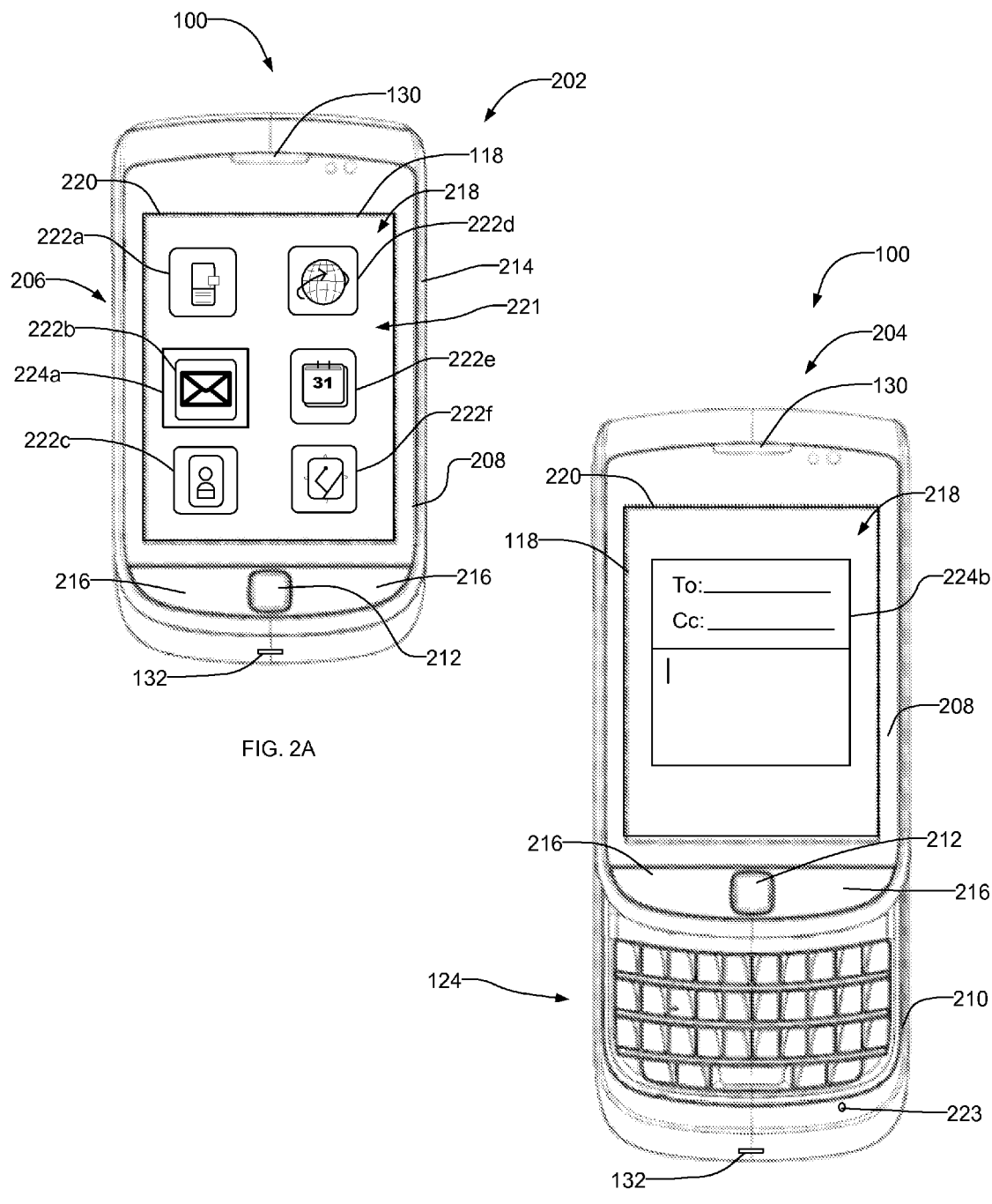

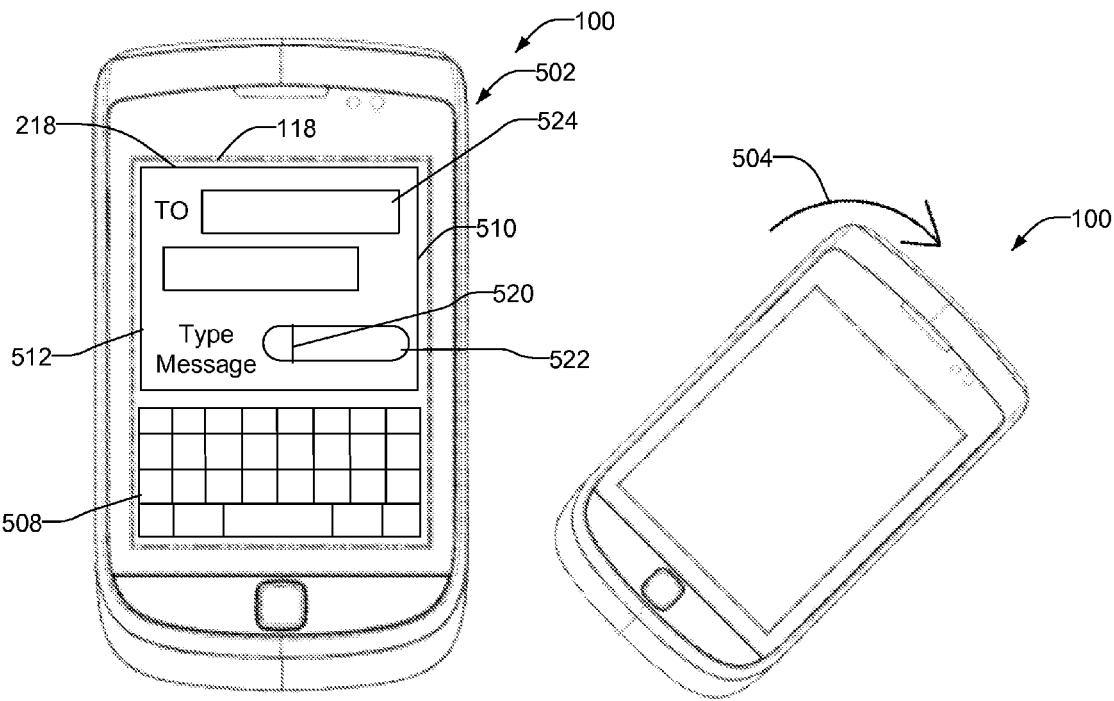
FIG. 5A
FIG. 5B
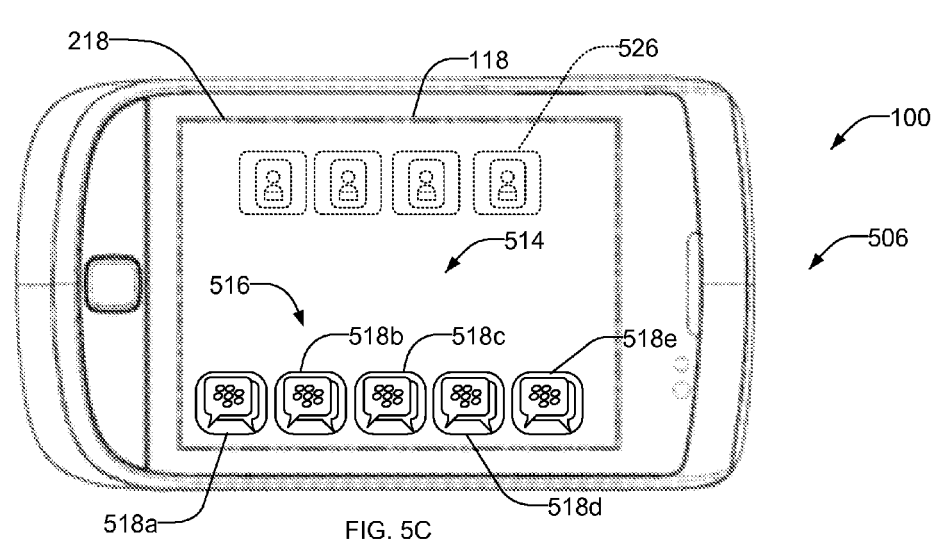
FIG. 5C

SYSTEMS AND METHODS FOR FACILITATING AN INPUT TO AN ELECTRONIC DEVICE

FIELD OF DISCLOSURE

The present disclosure relates to mobile devices, including but not limited to, system and methods for facilitating an input to an electronic device.

BACKGROUND

Electronic devices, including portable electronic devices, have gained widespread use and may provide a variety of functions including, for example, telephonic, electronic messaging, and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth capabilities, etc.

A user typically interacts with an electronic device via a graphical user interface (GUI). For example, a graphical user interface provides a display format to convey information to a user and receive inputs or commands from a user. A user can navigate through menu items such as icons, action commands, etc., to input information, choose commands, activate applications programs, manage files, and/or perform other functions. To select certain commands or functions such as, for example, to reply to an email communication, a user typically navigates through one or more menu items or icons to choose or select the desired command. Such navigation may be inconvenient or time consuming because electronic devices often have a relatively large number of menu items that a user often navigates to select a desired command and/or input information.

BRIEF DESCRIPTION OF THE DRAWINGS

FIG. 2A is an example portable electronic device of FIG. 1 shown in a closed position.

FIG. 2B is the example portable electronic device of FIG. 1 shown in an open position.

FIG. 5A illustrates the example electronic device of FIG. 1, FIG. 2A and FIG. 2B in another example first physical state showing a user selected application presented in a single application dedicated level.

FIG. 5B illustrates the example electronic device of FIG. 1, FIG. 2A and FIG. 2B being rotated relative to the first physical state of FIG. 5A.

FIG. 5C illustrates the example electronic device of FIG. 1, FIG. 2A, FIG. 2B and FIG. 5A in another example second physical state and presenting a plurality of instances associated with the application of FIG. 5A.

DETAILED DESCRIPTION

Figure 1:
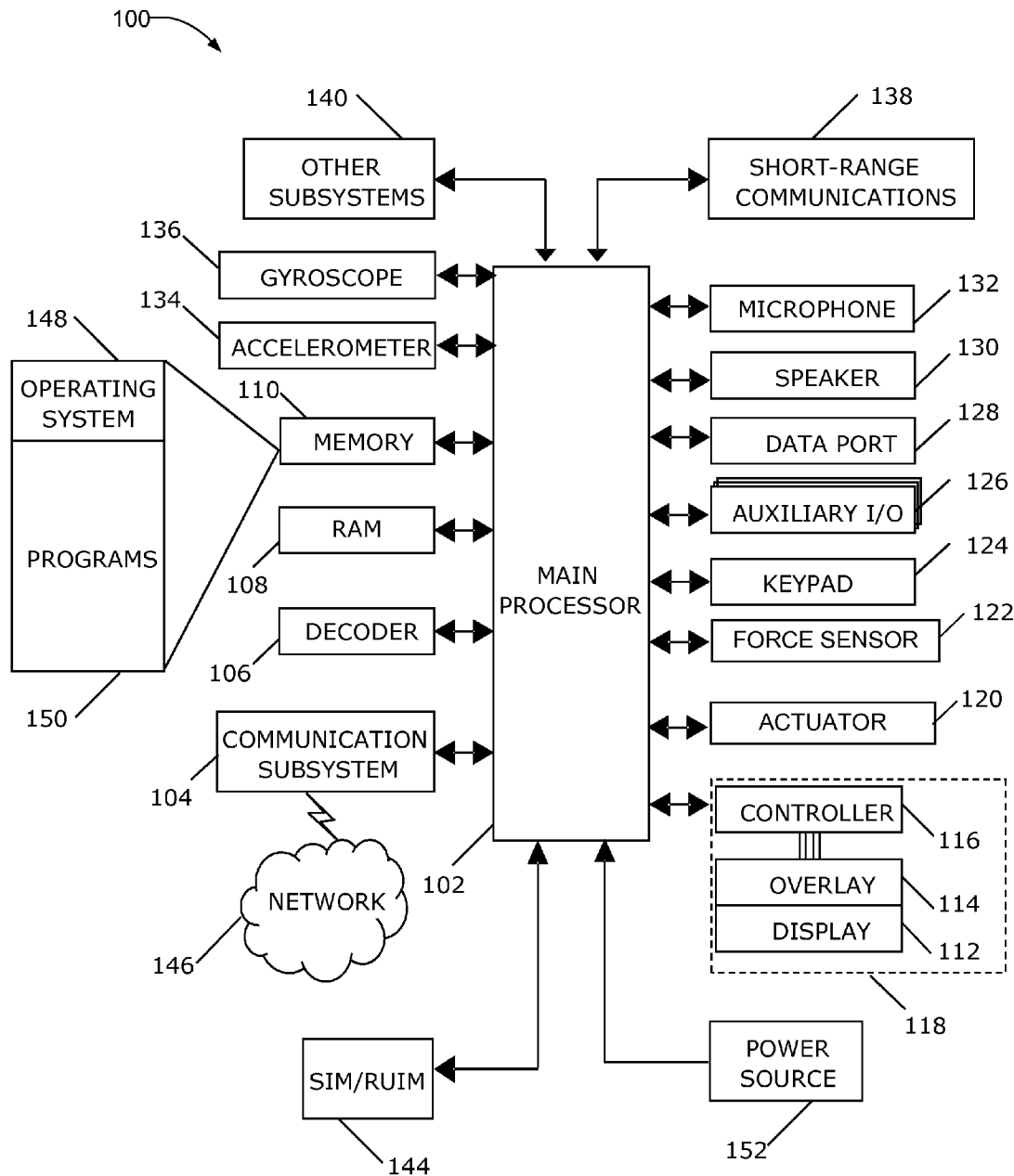
FIG. 1 is a block diagram of an example portable electronic device in accordance with the disclosure.

Example systems and methods disclosed herein can be used to implement a portable electronic device such as, for example, a cellular device or any mobile device. In general, the example methods and systems disclosed herein facilitate an input or a selection to an electronic device. For example, the example systems and methods described herein initiate an input field (e.g., an action input or command) associated with a selected menu item or icon (e.g., an application or event notification) without requiring a user to navigate through various menu items or commands to select or choose the desired input field associated with the selected menu item or icon. Instead, the example systems and methods disclosed herein trigger an event or input based on a sensed physical state, position or orientation of the electronic device. In some examples, a physical state of the electronic device includes moving (e.g., sliding, flipping, etc.) a first portion of a housing relative to a second portion of the housing to trigger an event. In other examples, a physical state of the electronic device includes rotating the electronic device between a first position (e.g., a portrait orientation) and a second position (e.g., a landscape orientation) to trigger an event.

For example, an example electronic device disclosed herein may use a moving action (e.g., a sliding action, a flipping action detected by a switch) of a housing of the example electronic device to provide a convenience key to initiate an input field or selection associated with a selected menu item or icon. In one example, a user selects a menu item or icon (e.g., an application or notification event) when the housing of the example electronic device is in a closed position and moves the housing of the electronic device between the closed position and an open position to initiate an input field associated with the selected menu item or icon (e.g., an application or event notification). To move an example electronic device between the closed position and the open position, a first portion of a housing of an example electronic device disclosed herein is moved (e.g., slides or flips) relative to a second portion of the housing. Thus, when a user moves a housing of an example electronic device to an open position, the electronic device presents or initiates an input field (e.g., an action input field) associated with a selected menu item or icon selected by a user when the example electronic device was in a closed position. For example, a menu item or icon selected is representative of an application or an event notification. To select a menu item or icon, a user can highlight the menu item associated with an application or event notification. The example electronic device identifies and determines the selected application or event notification received. A user, for example, can quickly activate or initiate an input field associated with the selected menu item or icon (e.g., an application or event notification) by moving the example electronic device from the closed position to an open position after selecting the menu item when the electronic device was in the closed position. The example electronic device detects the housing of the electronic device being moved in the open position and initiates an input field (e.g., predetermined input prompt) associated with the selected menu item or icon.

In another example, an example electronic device disclosed herein may detect a change in the physical orientation or position of the electronic device in space relative to a starting or initial position to activate or trigger an event. For example, the example electronic device may detect rotation of the housing between an initial or starting position being in a substantial portrait orientation and a second position being in a substantial landscape orientation relative to the initial position. In some examples, rotation of a housing of the electronic device provides a slideshow of a variety of different tabs or icons each representing different instances associated with an application or program to enable a user to select from the different tabs or icons. For example, if a user is in a particular chat room or web page, rotation of the electronic device from a portrait orientation to a landscape orientation displays all instances of a user selected application such as, for example, all open chats, messages, emails, web pages. A user can scroll or select a desired instance (e.g., a chat, a web page, an email, etc.). A user can then either rotate the housing to the portrait orientation to continue the chat or browsing the web page of the selected tab. Alternatively, the user can continue with the selected chat or web page with the housing in the landscape orientation.

Additionally or alternatively, the systems and methods described herein identify or determine the state of an application or event notification when the menu item is selected and initiate an input field based on the state of the application or event notification. For example, an electronic device disclosed herein displays or presents a first input field when an application or event notification is in a first state and displays or presents a second input field when an application or event notification is in a second state, where the first input field is different than the second input field.

For example, a first input field is presented when the menu item or icon associated with a particular application is selected or highlighted from a home screen state or icon state. For example, if a user highlights or selects a menu icon associated with an email application from a home screen state, the electronic device presents a blank-slate email screen to enable a user to compose a new message. A second input field is presented when the menu item or icon associated with the particular application is selected or highlighted from a single application dedicated level. For example, if a user highlights or selects a menu item or icon such as, for example, a particular email from a list of emails when the email application is being presented in a single application dedicated level (e.g., the email application is in an open state to present a list of emails), then the electronic device initiates a reply, reply to all, or forward input field associated with the particular email selected.

In some examples, a state of the application is determined based on a condition of a user selected application while the application is in a single application dedicated level. For example, as described below, a single dedicated level refers to an application of the electronic device that has been activated by a user and is presented by the electronic device. In some examples, the state of the application can be based on proximity of cursor location. For example, a first state of the application is determined when a cursor is located in a text field box of a messaging application (e.g., an email application, a text message application, etc.) and a second state of the application is determined when a cursor is located in a "to sender" field box. Based on the state of the application, a first input field is presented when the application is in a first state and a second input field is presented when the application is in a second state.

An input field associated with a menu item or icon (e.g., an application or event notification) to be initiated or presented when a user moves or alters a physical state of the housing of the electronic device may be programmed, customized, created, configured or selected (e.g., by a user, a manufacturer, etc.) when configuring an example electronic device disclosed herein.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the examples described. The description is not to be considered as limited to the scope of the examples described herein.

The disclosure generally relates to electronic devices such as, for example, a portable electronic device in the examples described herein. Examples of portable electronic devices include mobile, or handheld, wireless communication devices such as pagers, cellular phones, cellular smartphones, wireless organizers, tablet computers, personal digital assistants, wirelessly enabled notebook computers, and so forth. The portable electronic device may also be a portable electronic device without wireless communication capabilities, such as a handheld electronic game device, digital photograph album, digital camera, or other device.

A block diagram of an example portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 146. The wireless network 146 may be any type of wireless network, including, but not limited to, data wireless networks, voice wireless networks, and networks that support both voice and data communications. A power source 152, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, one or more actuator apparatus 120, one or more force sensors 122, a keypad 124, an auxiliary input/output (I/O) subsystem 126, a data port 128, a speaker 130, a microphone 132, an accelerometer 134, a gyroscope 136, a magnetometer (not shown), short-range communications 138, and other device subsystems 140. User-interaction with a graphical user interface is performed through the touch-sensitive display 118. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. In some examples, the display 112 may include a primary display and a secondary display. The display of information between the primary and the secondary displays are coordinated to provide information to a user when an electronic device is in an open position or a closed position as described in greater detail below in connection with FIGS. 3A and 3B.

To identify a subscriber for network access, the portable electronic device 100 uses a Subscriber Identity Module or a Removable User Identity Module (SIM/RUIM) card 144 for communication with a network, such as the wireless network 146. Alternatively, user identification information may be programmed into memory 110.

The portable electronic device 100 includes an operating system 148 and software programs or components 150 that are executed by the processor 102 to implement various applications and are typically stored in a persistent, updatable store such as the memory 110. Additional applications or programs may be loaded onto the portable electronic device 100 through the wireless network 146, the auxiliary I/O subsystem 126, the data port 128, the short-range communications subsystem 138, or any other suitable subsystem 140.

A received signal such as a text message, an e-mail message, or web page download is processed by the communication subsystem 104 and input to the processor 102. The processor 102 processes the received signal for output to the display 112 and/or to the auxiliary I/O subsystem 126. A subscriber may generate data items, for example e-mail messages, which may be transmitted over the wireless network 146 through the communication subsystem 104. For voice communications, the overall operation of the portable electronic device 100 is similar. The speaker 130 outputs audible information converted from electrical signals, and the microphone 132 converts audible information into electrical signals for processing.

FIG. 2A is a front view of the portable electronic device 100 of FIG. 1 shown in a first physical state, such as a closed position 202. FIG. 2B is a front view of the portable electronic device 100 of FIGS. 1 and 2A shown in a second physical state, such as an open position 204. In the example of FIGS. 2A and 2B, the portable electronic device 100 is a handheld communication device or a mobile device such as mobile phone. As mentioned above, the electronic device 100 may be a data and/or voice-enabled handheld device that may be used to send and receive a message, a voice communication, a textual entry, etc. Thus, the electronic device 100 may provide a variety of functions including, for example, telephonic, electronic messaging, and other personal information manager (PIM) application functions.

Referring to FIGS. 2A and 2B, the electronic device 100 includes a housing 206 that encloses the electronic or mobile components described above in connection with FIG. 1. For example, the housing 206 encloses the microprocessor 102, the touch screen display 118, the keypad 124 (FIG. 2B), the speaker 130, the microphone 132, an accelerometer 134, a gyroscope 136, etc. The housing 206 of the illustrated example can be held in one hand by a user of the electronic device 100 during data (e.g., text) and/or voice communications.

In this example, the housing 206 of the electronic device 100 includes an upper housing portion or lid 208 and a lower housing portion or base 210 (FIG. 2B) (e.g., a slider configuration). The upper housing portion 208 houses the touch screen display 118, and the lower housing portion 210 houses the keypad 124. For example, the keypad 124 may be QWERTY style keypad or any other suitable type of keypad. In this example, the upper housing portion 208 moves or slides relative to the lower housing portion 210 between the closed position 202 shown in FIG. 2A, at which the upper housing portion 208 substantially aligns with the lower housing portion 210 to cover or hide the keypad 124, and the open position 204 shown in FIG. 2B, at which the upper housing portion 208 at least partially moves away from the lower housing portion 210 to expose the keypad 124.

When the electronic device 100 is in the first physical state, or closed position 202, shown in FIG. 2A, a user can interact with the electronic device 100 via the touch screen display 118. In this example, to facilitate navigation through menu items, the electronic device 100 of FIGS. 2A and 2B includes an auxiliary input 212. The auxiliary input 212 provides a cursor or navigation tool. In addition to being used as a cursor or navigation tool, the auxiliary input 212 can act as an actuator when the auxiliary input 212 is depressed like a button. The auxiliary input 212 may be a trackpad, a trackball, a touch pad, etc. Although in this example the auxiliary input 212 is disposed within the upper housing portion 208, the auxiliary input 212 may be disposed on any surface of the housing 206 such as, for example, a side surface 214, the lower housing portion 210, etc. In this example, the electronic device 100 also includes one or more action keys 216 adjacent the auxiliary input 212. For example, the action keys 216 may include an on/off button or call end button, a call send button, a menu button, an escape key, etc. When the electronic device 100 is in the closed position 202 as shown in FIG. 2A, a user can interact with the electronic device 100 without having to move the housing 206 to the open position 204. For example, a user may place a telephonic call, view the Internet, read and/or send email, view and/or send a text message, view and/or edit a calendar, etc. Thus, when the electronic device 100 is in the closed position 202, a user may select a menu item or icon to select a desired application or command. A virtual keypad may be provided via the touch screen display 118 to enable a user to input information when the electronic device 100 is in the closed position 202.

Additionally or alternatively, when the electronic device 100 is in the open position 204, a user can interact with the electronic device 100 by selecting menu items or icons via the keypad 124 to choose commands or input fields, execute application programs, and/or perform other functions. Additionally, in the open position 204, a user may also interact with the electronic device 100 via the touch screen display 118, the auxiliary input 212 and/or the function keys 216, in combination with the keypad 124.

The electronic device 100 includes a sensor or switch 223 that provides a signal to the processor 102 to detect the physical state of the electronic device 100 (e.g., when the housing 206 is in the closed position 202 or the open position 204). For example, the sensor 223 generates an open or close signal according to the position of the housing 206. The processor 102 processes the signal received from the sensor 223 and determines if the housing 206 is in the open position 204 or the closed position 202. For example, the sensor or switch 223 may include, but is not limited to, a Hall sensor, an optical sensor, an electromagnetic switch, a contact switch, a mechanical switch, etc.

To enable a user to interact with the electronic device 100, the electronic device 100 includes a graphical user interface 218 (GUI) controlled by, for example, the operating system 148 (FIG. 1). Generally, the GUI 218 is used to convey information and/or receive commands or information from a user, and includes a variety of GUI objects or controls that include, for example, apps, icons, toolbars, drop-down menus, pop-up menus, text, dialog boxes, buttons, etc. In other words, the GUI 218 provides a display format providing information to a user and enables the user to choose commands, execute application programs, manage computer files, and/or perform other functions by selecting menu items or icons representative of applications, notification events, etc.

In the illustrated example of FIG. 2A, the GUI 218 provides a window 220 in which a user may view a menu item (i.e., an icon), an application (e.g., an app) and/or a document. As shown in FIG. 2A, multiple menu items or icons 222a-f are displayed in the window 220. More specifically, in the illustrated example, the GUI 218 presents the menu items or icons 222a-f in an icon state or home screen state 221. The user interface (e.g., the touch screen display 118) presents the home screen state 221 (e.g., a home screen) to enable a user to select or choose from the menu items or icons 222a-f, each being representative of different applications and/or event notifications. Although in some instances the home screen state 221 may be a single level dedicated application, the home screen state 221 presents options to enable a user to select or choose from a variety of different applications and/or event notifications.

A user typically interacts with the GUI 218 via the touch screen display 118, the auxiliary input 212, the keypad 124, and/or the function keys 216. For example, a user can navigate through the menu items 222a-f and can select or highlight an application or icon 222b presented in the home screen state 221 via the auxiliary input 212, the keypad 124, the touch screen display 118, etc. In one example, the auxiliary input 212 may be used to position a pointer or cursor 224a over an object (e.g., a menu item) on the GUI 218 to highlight an icon or item (e.g., the menu item 222b) on the touch screen display 118 and the menu item 222b can be selected by depressing the auxiliary input 212 or touching the touch screen display 118 directly. Some example applications that a user may select from the home screen state 221 include, but not limited to, an event notification (e.g., a newly received email), an email application, a text message application, a multi-media message (MMS) application, an instant message (IM) application, BlackBerry® messenger (bbm™) application, a voice mail application, a task application, a calendar application, a navigation application, an internet (e.g., a web-surfing) application, an alarm application, a contact application, etc.

When a menu item or icon is activated, the application associated with the selected menu icon is presented in a single application dedicated level through which a user typically navigates through one or more menu items (or pop-up common actions) to command the electronic device 100 to perform a desired function associated with that particular application. For example, a user navigates through one or more menu items to activate an email application, and the user then navigates through one or more other menu items accessible via the single application dedicated level to compose a new email message while the user is in the email application. In other examples, when a user is reading an email message, a user navigates through one or more menu items to reply, reply to all, or forward the email message to a desired recipient(s). In some instances, navigating through menu items can be time consuming and/or frustrating for a user of the electronic device 100.

To trigger an event or initiate an input field associated with a selected menu item without having to navigate through additional menu items, the example electronic device 100 of FIG. 2A and FIG. 2B uses the sliding action of the upper housing portion 208 relative to the lower housing portion 210 as a convenience or activation key (e.g., a hot key) to initiate (e.g., automatically initiate) an input field (e.g., an input prompt) associated with a selected menu item or icon (e.g., an application or event notification). More specifically, the electronic device 100 initiates a predetermined input field associated with a selected menu item representative of an application or notification event when the housing 206 of the electronic device 100 is moved between the closed position 202 and the open position 204. For example, when the electronic device 100 is in the closed position 202 of FIG. 2A, a user can highlight or select a menu item 222b. After the selection, when the user moves the housing 206 from the closed position 202 to the open position 204 shown in FIG. 2B, the electronic device 100 initiates an input field 224b associated with the menu item 222b selected when the electronic device 100 was in the closed position 202.

In the illustrated example of FIG. 2A and FIG. 2B, the selected menu item 222b is a menu item or icon associated with an email application. For example, a user can compose a new email communication by selecting or highlighting the menu item or icon 222b of FIG. 2A representative of an email application from the home screen 221 using the auxiliary input 212 when the electronic device 100 is in the closed position 202. The user can then slide the upper housing portion 208 relative to the lower housing portion 210 to expose the keypad 124 as shown in FIG. 2B. When the user slides the upper housing portion 208 to the open position 204, the electronic device 100 detects movement of the upper housing portion 208 between the closed position 202 and the open position 204 and initiates or presents an input field 224b associated with the selected email application 222b. In this example, the GUI 218 displays or presents the input field 224b to enable the user to compose an email communication (e.g., a blank-slate email) that would otherwise require the user to navigate through one or more menu items or icons to select such a command. Thus, the sliding action of the electronic device 100 from the closed position 202 to the open position 204 activates the input field 224b associated with the particular menu item or icon 222b highlighted or selected by a user when the electronic device 100 is in the closed position 202. The electronic device 100 communicates the information inputted via the input field 224b to the active application 222b.

As noted above, in some examples, the electronic device 100 determines or detects a state of an application associated with a selected menu item or icon when the electronic device 100 is in the closed position 202 and initiates or presents an input field based on the state of the application. In other words, the input field for a particular application can differ depending on the state of the application detected by the electronic device 100 when the housing 206 is in the closed position 202.

Figure 3A:
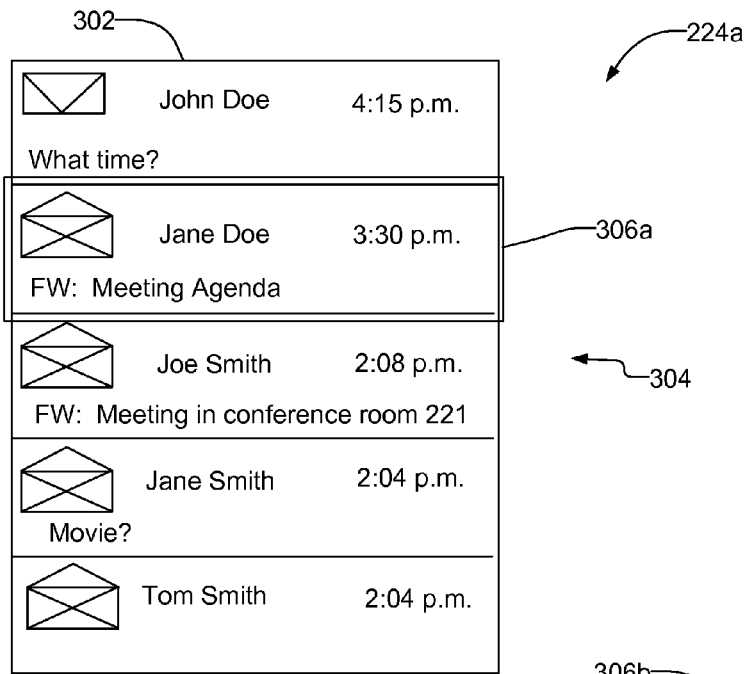
FIG. 3A illustrates an example email application of the example portable electronic device of FIGS. 1, 2A and 2B being presented in a single application dedicated level.
Figure 3B:
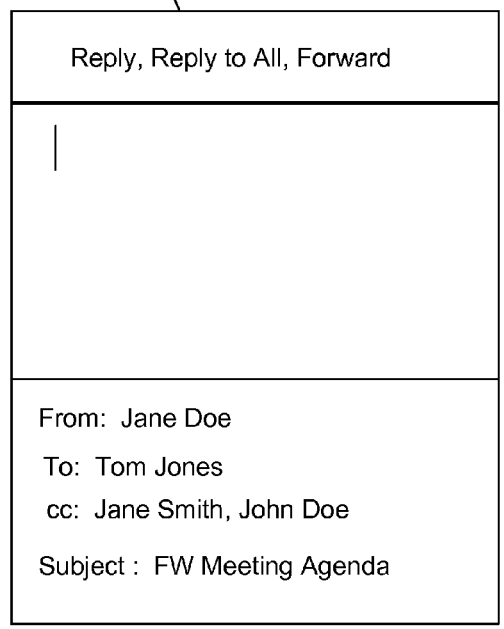
FIG. 3B illustrates an example input field initiated that is associated with the example email application of FIG. 3A.

FIG. 3A and FIG. 3B illustrate an example input field 302 initiated when the email application 222b of FIG. 2A is in a second or different state or level 304 (than that shown in FIG. 2A) when a menu item or icon is selected.

For example, in FIG. 2A, the menu item or icon 222b selected is representative of an email application presented in the home screen state 221. As noted above in connection with FIGS. 2A and 2B, when the email application 222b is selected or highlighted from the home screen state 221 while the electronic device 100 is in the closed position 202, the electronic device 100 presents the input field 224b that prompts a user to compose a new email message communication by moving the electronic device 100 to the open position 202.

As shown in FIG. 3A, the application associated with the menu item or icon 222b of FIG. 2A is activated and presented in a single application dedicated level 302 (e.g., a user navigated through the email application) when the electronic device 100 is in the closed position 202. For example, a user may navigate through one or more menu items when the electronic device 100 is in the closed position 202 to reach the single application dedicated level 302. For example, in the single application dedicated level, the email application 222b presents or displays a list of emails 304. As shown in FIGS. 3A and 3B, a user can select or highlight a particular email message 306a from the list of emails 304 while the electronic device 100 is in the closed position 202. The electronic device 100 detects that the email application is in the single application dedicated level 302, and electronic device 100 provides or initiates an input field 306b (e.g., a different input field than input field 224b) to enable a user to reply, reply to all, or forward the selected email communication 306a when the electronic device 100 detects that the upper housing portion 208 is moved to the open position 204 while the application associated with the selected menu item is in the single application dedicated level 302.

In other words, the electronic device 100 provides or presents a first input field (e.g., the input field 224b) when a menu item or icon (e.g., the menu item 222b) associated with a particular application that is selected while the particular application is in a first state (e.g., a home screen state 221) and presents or provides a second input field (e.g., the input field 306b) different than the first input field when a menu item or icon (e.g., the menu item 306a) associated with the particular application is selected when the particular application is in a second state (e.g., the single application dedicated level 302). For example, the electronic device 100 initiates or presents the input field 224b when the email application 222b is selected or highlighted from the home screen state 221 as shown in FIG. 2A, and the electronic device 100 initiates the input field 306b of FIG. 3B when the email application 222b is navigated to the single application dedicated level 302 (e.g., a different level, a higher level) as shown in FIG. 3A. Thus, the electronic device 100 determines the state of the particular application or notification event selected when the electronic device 100 is in the closed position 202 and initiates or presents an input field based on the state of the application or event notification when the menu item or icon representative of the particular application or event notification is selected.

The electronic device 100 may be configured to present or display different input fields for each menu item, icon, application and/or notification event supported by the electronic device 100. FIGS. 4A-4G illustrate other example input fields associated with different menu items.

Figure 4A:
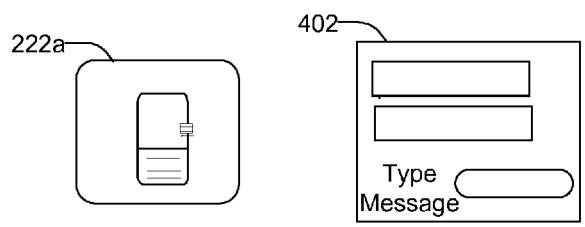
FIG. 4A illustrates an example input field associated with an example text message application of the example portable electronic device of FIG. 1, FIG. 2A and FIG. 2B.

Referring to FIG. 4A, when the menu item 222a representative of a text message application is selected or highlighted from the home screen state 221 when the electronic device 100 is in the closed position 202, the electronic device 100 initiates or presents a new text message input field 402 when the electronic device 100 is moved to the open position 204.

Figure 4D:
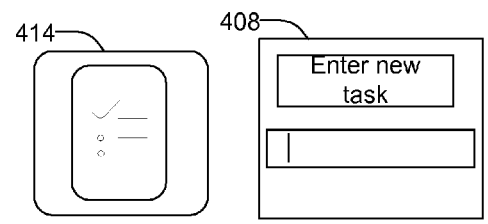
FIG. 4D illustrates an example input field associated with an example task list application of the example portable electronic device of FIG. 1, FIG. 2A and FIG. 2B.
Figure 4B:
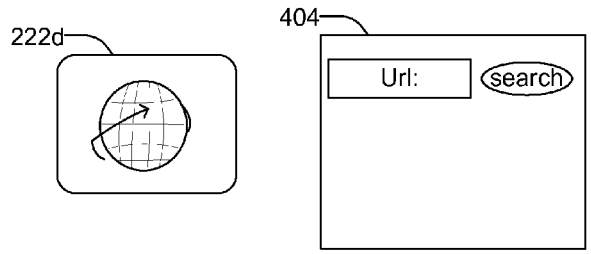
FIG. 4B illustrates an example input field associated with an example web browser application of the example portable electronic device of FIG. 1, FIG. 2A and FIG. 2B.

Referring to FIG. 4B, when the menu item 222d representative of an internet browser application is selected or highlighted from the home screen state 221 when the electronic device 100 is in the closed position 202, the electronic device 100 initiates or presents a search input field 404 (e.g., a search command) when the electronic device 100 is moved to the open position 204.

Figure 4E:
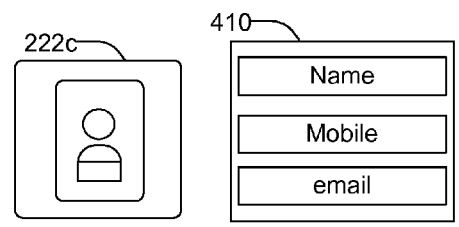
FIG. 4E illustrates an example input field associated with an example contacts application of the example portable electronic device of FIG. 1, FIG. 2A and FIG. 2B.
Figure 4C:
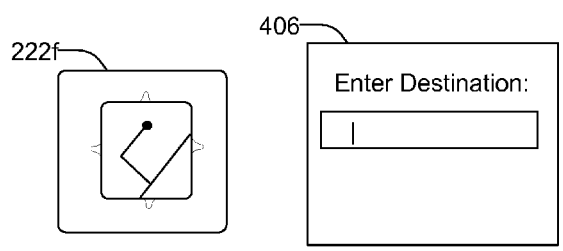
FIG. 4C illustrates an example input field associated with an example navigation application of the example portable electronic device of FIG. 1, FIG. 2A and FIG. 2B.

Referring to FIG. 4C, when the menu item 222f representative of a navigation application presented is selected or highlighted from the home screen state 221 when the electronic device 100 is in the closed position 202, the electronic device 100 initiates or presents a destination entry input field 406 when the electronic device 100 is moved to the open position 204.

Referring to FIG. 4D, when a menu item 414 representative of a task application is selected or highlighted from the home screen state 221 when the electronic device 100 is in the closed position 202, the electronic device 100 initiates or presents a new task input field 408 when the electronic device 100 is moved to the open position 204.

Referring to FIG. 4E, when the menu item 222c representative of a contacts application is selected or highlighted from the home screen state 221 when the electronic device 100 is in the closed position 202, the electronic device 100 initiates or presents an edit contact input field 410 when the electronic device 100 is moved to the open position 204.

Figure 4F:
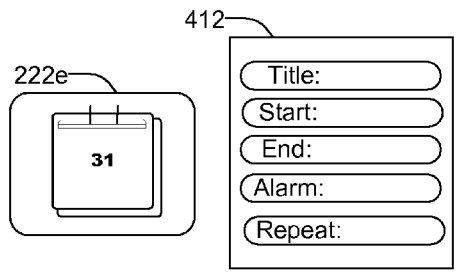
FIG. 4F illustrates an example input field associated with an example calendar application of the example portable electronic device of FIG. 1, FIG. 2A and FIG. 2B.

Referring to FIG. 4F, when the menu item 222e associated with a calendar application is selected or highlighted from the home screen state 221 when the electronic device 100 is in the closed position 202, the electronic device 100 initiates or presents an entry data input field 412 when the electronic device 100 is moved to the open position 204.

As noted above, the input fields 402-412 can differ depending on the state of the application selected. For example, when the electronic device 100 is in the closed position 202, a user may further navigate the text message application 222a to a single application dedicated level presenting a listing of text messages received. A user can highlight or select a particular text message within the list when the electronic device 100 is in the closed position 202. The electronic device 100 then initiates or presents an input field prompting a user to reply or forward the text message when the electronic device is moved to the open position 204.

Additionally or alternatively, an application may be an event manager (e.g., an email manager, a text message manager, etc.). The GUI 218 can display, for example, an event notification, alerting a user to a new or unacknowledged event, such as an incoming email, an incoming text message, an incoming phone call, an incoming multi-media message (MMS), an incoming instant message (IM), a voice mail notification, a task reminder, an upcoming calendar event, or an alarm event, etc. When a user receives a notification while the electronic device 100 is in the closed position 202, the electronic device 100 initiates an input field associated with that particular notification (and the state of the application) when a user moves or slides the upper housing portion 208 to the open position 204. For example, if a new email message notification is provided when the electronic device 100 is in the closed position 202, a user can slide the upper housing portion 208 of the electronic device 100 to the open position 204 and GUI 218 displays the most recently received email message or initiates an input field (e.g., an input prompt) to enable a user to reply, reply to all, or forward the email communication.

Additionally or alternatively, if a user is using another application such as, for example, a music player application and an event notification (e.g., an email notification, a text message notification, an instant message notification, a calendar notification, an alarm notification, etc.) is displayed via the GUI 218 when the housing 206 of the electronic device 100 is in the closed position 202, the user can move the upper housing portion 208 of the electronic device 100 to the open position 202 to activate, view or open the most recently received notification event (e.g., an email message, a text message, an instant message, a voice mail message, a calendar notification, an alarm notification, etc.).

An input field feature associated with a particular application or event notification provided or presented when moving the upper housing portion 208 of the electronic device 100 between the closed position 202 and the open position 204 can be implemented or used with any desired application. An input field may be programmable to be any desired input field associated with a particular application and/or the state of the application. For example, a user or a manufacturer of the electronic device 100 may select, customize, configure, create and/or set any desired input field(s) associated with a particular application or event notification to initiate when the electronic device 100 is moved to the open position 204 when a menu item or application is selected or highlighted while the electronic device 100 is in the closed position 202.

Although the example electronic device of FIGS. 2A and 2B includes a touch screen display 118, the electronic device 100 may include a non-touch screen display. In this example, a user navigates through menu items or icons via the auxiliary input 212 and selects the menu item or icon 222 by depressing the auxiliary input 212 and/or via the keypad 124.

FIGS. 5A-5C illustrate the example portable electronic device 100 of FIGS. 1, 2A, and 2B using another example physical state or orientation of the electronic device 100 to initiate or trigger an event. FIG. 5A illustrates the electronic device 100 in an initial or starting position 502 (e.g., a portrait orientation, a substantial vertical orientation). FIG. 5B illustrates the electronic device 100 being rotated in a direction 504 relative to the initial position 502. FIG. 5C illustrates the electronic device 100 in a second or end position 506 (e.g., a landscape orientation, a substantial horizontal orientation).

Referring to FIG. 5A, a virtual keypad 508 and a user selected application 510 is being displayed by the GUI 218 in a single application dedicated level 512 while the electronic device 100 is in the initial position 502. Additionally, a user may have multiple instances (e.g., instances 516 of FIG. 5C) associated with the user selected application 510 that are open or running and not being displayed when the electronic device 100 is the position 502. For example, the application 510 may be an instant messaging application (e.g., Blackberry Messenger®) and a user may have different instances associated with the instant messaging application such as, for example, multiple messages or chats that are open or actively running in the background.

To trigger an event or initiate an input field associated with the user selected application 510 without having to navigate through additional menu items, the electronic device 100 uses a rotating action of the electronic device 100 as a convenience or activation key (e.g., a hot key) to initiate (e.g., automatically initiate) an input field (e.g., an input prompt) associated with a selected menu item or icon (e.g., an application or event notification). For example, a user rotates the electronic device 100 from, for example, the position 502 shown in FIG. 5A to the position 506 shown in FIG. 5C to trigger an event.

In some examples, changing the physical state or orientation of the electronic device 100 enables a user to select or switch between different instances 514 (e.g., instant messages or chats) associated with the user selected application 510 that are open or active by simply rotating the electronic device 100 between the positions 502 and 506. For example, when the electronic device 100 is rotated from the position 502 of FIG. 5A to the position 506 of FIG. 5C, the electronic device 100 causes the GUI 218 to display (e.g., via a slide show, tabs, etc.) all of the different instances 514 associated with the user selected application 510 that have been opened by a user and are active or running. For example, as shown in FIG. 5C, the GUI 218 displays a plurality of tabs or icons 516 each being representative of different instances 518a-e (e.g., instant messages or chats) associated with the user selected application 510 (e.g., the instant messaging application) that are active or running and not being displayed by the GUI 218 when the electronic device 100 is in the orientation 502.

A user can select or highlight any one of the icons or tabs 518a-e when the electronic device 100 is in the position 506 of FIG. 5C to activate that particular user selected or highlighted icon or tab in a single application dedicated level. For example, after a particular icon or tab 518a is selected, a user can rotate the electronic device 100 to the position 502 of FIG. 5A and the GUI 218 presents the selected or highlighted icon or tab 518a in the single application dedicated level. Thus, a user can switch between different instances 514 associated with a particular user selected application 512 (e.g., instant messages) by simply rotating the electronic device 100, for example, 90 degrees from the initial position 502, selecting a tab or icon representative of a particular instance (e.g., the tabs 518a-e) of the user selected application 510, and rotating the electronic device 100 back 90 degrees to the position 502 to activate or display the selected instance in a single application dedicated level.

In other examples, the user selected application 510 may be, for example, an internet browser application, an email application, a text message application, etc., and the instances 514 associated with the application 510 displayed when the electronic device 100 is rotated to the position 506 of FIG. 5C may be web pages, emails and text messages, respectively. For example, rotation of the electronic device 100 between the positions 502 and 506 enables a user to select or switch between a plurality of web pages, email messages, text messages, navigation queries, calendar events, tasks, etc.

In some examples, the electronic device 100 detects the state of the application 510 and causes the GUI 218 to display a first input field associated with a first state of the application 510 and causes the GUI 218 to display a second input field associated with a second state of the application 510. For example, the electronic device 100 can detect proximity of cursor location to determine whether the application 510 is in a first state or a second state. For example, if the application 510 of FIG. 5A is a text message application, an email application, a chat application, etc., the electronic device 100 can activate different input fields based on a location of a cursor 520 when the electronic device 100 is rotated to the position 506. For example, if the cursor 520 is located within a "text" field 522 when the electronic device 100 is in the orientation or position 502 and is then rotated to the position 506, the electronic device 100 displays a plurality of instances 514 (e.g., different chats, instant messages, emails, etc.) associated with the application 510 that are currently running or active as shown above in FIG. 5C. However, if the cursor 520 is located in a "to sender" field 524 when the electronic device 100 is in the orientation or position 502 and is then rotated to the position 506, the electronic device 100 presents or displays a plurality of contacts 526 from which a user can select. For example, the GUI 218 can display the contacts 526 in a slideshow format and a user can scroll through the slideshow via the touch screen display 118 to select desired recipients of a particular message (e.g., an email message, a text message, etc.).

Figure 5D:
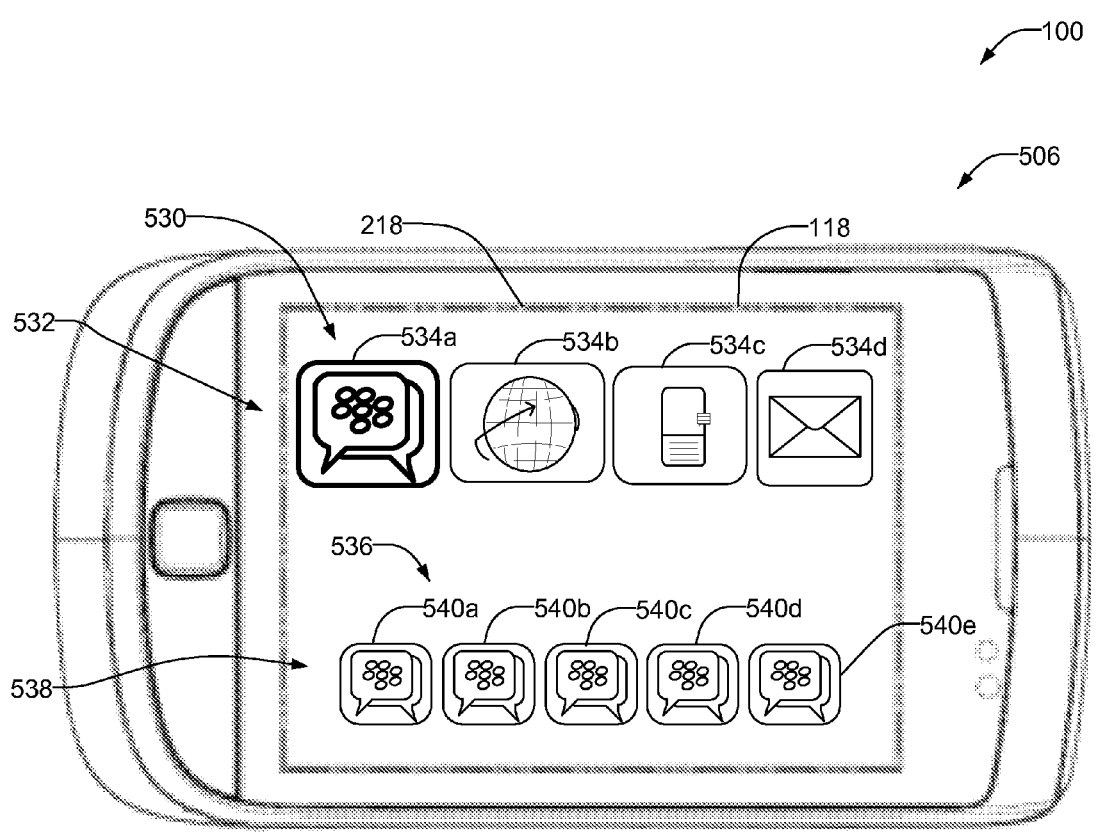
FIG. 5D illustrates the example electronic device of FIG. 5A in the second physical state and presenting a first level of a plurality of user selected applications and a second level of a plurality of instances associated with a selected application from the plurality of user selected applications.

Further, as shown in FIG. 5D, the electronic device 100 may display a plurality of user selected or activated applications 530 that are active or running when the electronic device is rotated to the position 506. For example, at a first level 532, user selected applications 530 that are active may be displayed as icons or tabs 534a-d, each being representative of the user selected applications 530 such as, for example, an instant messaging application 534a, an internet browser application 534b, a text message application 534c, an email application 534d, etc. In this manner, a user can navigate through different active user selected applications 534a-d by simply rotating the electronic device 100 to the position 506, selecting a desired active application 534a-d, and rotating the electronic device 100 to the position 502 to activate that particular selected application 534a in a single application dedicated level.

Additionally, the electronic device 100 may display a plurality of instances 536 at a second level 538 associated with each of the user selected applications 534a-d that are currently open or running. For example, the first level 532 displays all currently open user selected applications 530 such as, for example, the instant message application 534a, the internet browser application 534b, the text message application 534c, the email application 534d, etc., and highlighting or selecting a particular application at the first level 532 displays instances (e.g., instant messages) that are associated with one of the selected applications at the second level 538. For example, as shown in FIG. 5D, selecting or highlighting the instant message application 534a at the first level 532 displays the active instant messages 540a-d currently running that are associated with the selected instant message application 534a at the second level 538. In other examples, if the email application 534d is selected at the first level 532, icons or tabs associated with emails that are open are displayed at the second level 538. If the internet browser application 534b is selected at the first level 532, icons or tabs associated with open web pages are displayed at the second level 538.

To detect movement or rotation in the physical state or orientation of the electronic device 100, the electronic device 100 employs the accelerometer 134. The accelerometer 134 provides a signal to enable the processor 102 to detect movement of the electronic device 100 when a user rotates the electronic device from the position or orientation 502 of FIG. 5A to the position or orientation 506 of FIG. 5C. Additionally or alternatively, the electronic device 100 may employ the gyroscope 136 to detect the orientation of the electronic device 100 when, for example, the electronic device 100 is in the positions 502 or 506. In other examples, the electronic device 100 may employ a magnetometer or any other device to detect an orientation and/or movement of the electronic device 100.

Although the example electronic device 100 includes a housing 202 having a slider configuration, the examples may be implemented with any other type of electronic devices that do not employ a housing having a slider configuration, or first portion of a housing that moves relative to a second portion of the housing.

Figures 6A, 6B:
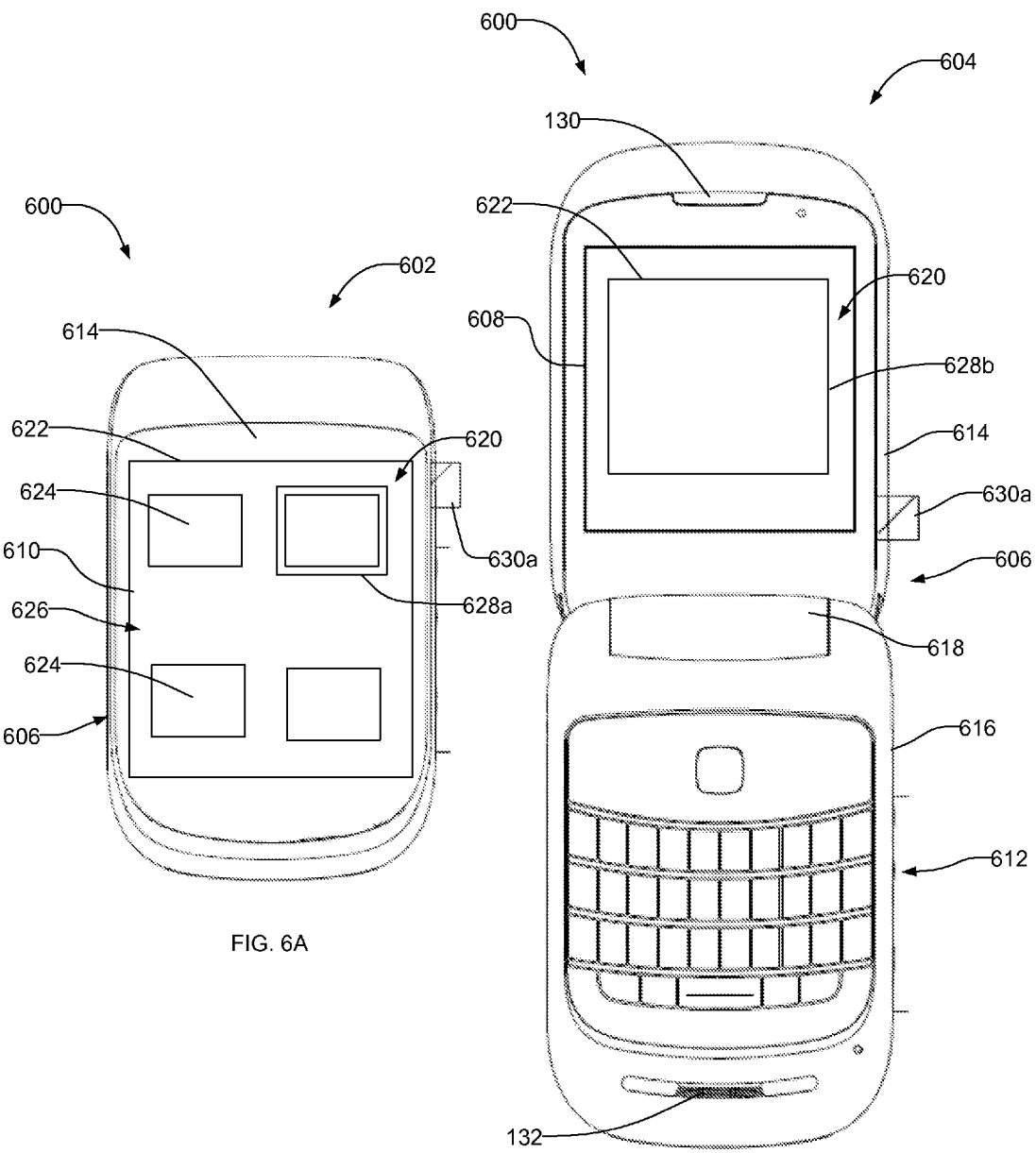
FIG. 6A is another example portable electronic device disclosed herein shown in a closed position.
FIG. 6B illustrates the example portable electronic device of FIG. 6A, but shown in an open position.

FIG. 6A and FIG. 6B illustrate another example portable electronic device 600 disclosed herein that can trigger or initiate an event based on a detected physical state or orientation of the electronic device 600. FIG. 6A is a front view of the portable electronic device 600 shown in a closed position 602. FIG. 6B is a front view of the portable electronic device 600 shown in an open position 604.

Similar to the housing 206 of the electronic device 100 of FIGS. 1, 2A and 2B, the electronic device 600 includes a housing 606 that encloses the electronic or mobile components such as, for example, the electronic components described above in connection with FIG. 1. For example, the housing 606 encloses the microprocessor 102, a primary display 608 (FIG. 6B), a secondary display 610 (FIG. 6A), a keypad 612, the speaker 130, the microphone 132, the accelerometer 134, the gyroscope 136, etc.

In this example, the housing 606 of the electronic device 600 includes an upper housing portion or lid 614 pivotally coupled to a lower housing portion or base 616 via a hinge 618. In the example of FIGS. 6A and 6B, the upper housing portion 614 houses the primary and secondary displays 608 and 610, and the lower housing portion 616 houses the keypad 612. For example, the primary display 608 is viewable by a user when the electronic device 600 is in the open position 604 and the secondary display 610 is viewable by a user when the electronic device 600 is in the closed position 602. The primary and secondary displays 608, 610 coordinate the display of information when the electronic device 600 is positioned between the closed position 602 and the open position 604.

A user interacts with the electronic device 600 via a graphical user interface 620 controlled by, for example, the operating system 148 (FIG. 1). The GUI 620 provides a window 622 in which a user may view one or more menu items, applications or documents 624 via, for example, a home screen 626 displayed within the window 622. For example, when the electronic device 600 is in the closed position 602, the GUI 620 provides menu items 624 via the secondary display 610. A user can highlight or select a desired menu item or icon 628a via an auxiliary input 630a.

To initiate an input field 628b without having to navigate through menu items, the example electronic device 600 of FIGS. 6A and 6B uses the flipping action of the upper housing 614 relative to the lower housing 616 to provide a convenience or activation key (e.g., a hot key) to initiate the input field 628b associated with the selected menu item 628a (e.g., an application or event notification) when the electronic device 600 is moved from the closed position 602 to the open position 604. For example, the menu items 624 may be, for example, the menu items 222a-f of FIG. 2A. Thus, the electronic device 600 can be implemented with an automatic command feature described above when moving the electronic device 600 between the closed position 602 and the open position 604.

Further, although not shown, to initiate or trigger an event described in connection with FIGS. 5A-5D, the electronic device 600 may be rotated to a position (e.g., 90 degrees) relative to its initial or starting position or orientation shown in FIG. 6A, without moving or flipping the upper housing 614 relative to the lower housing 616. For example, the electronic device 600 may be rotated to display or present a plurality of tabs or icons representative of instances associated with a selected application as described above when the electronic device 600 is rotated while in either the closed position 602 or the open position 604.

Figure 7:
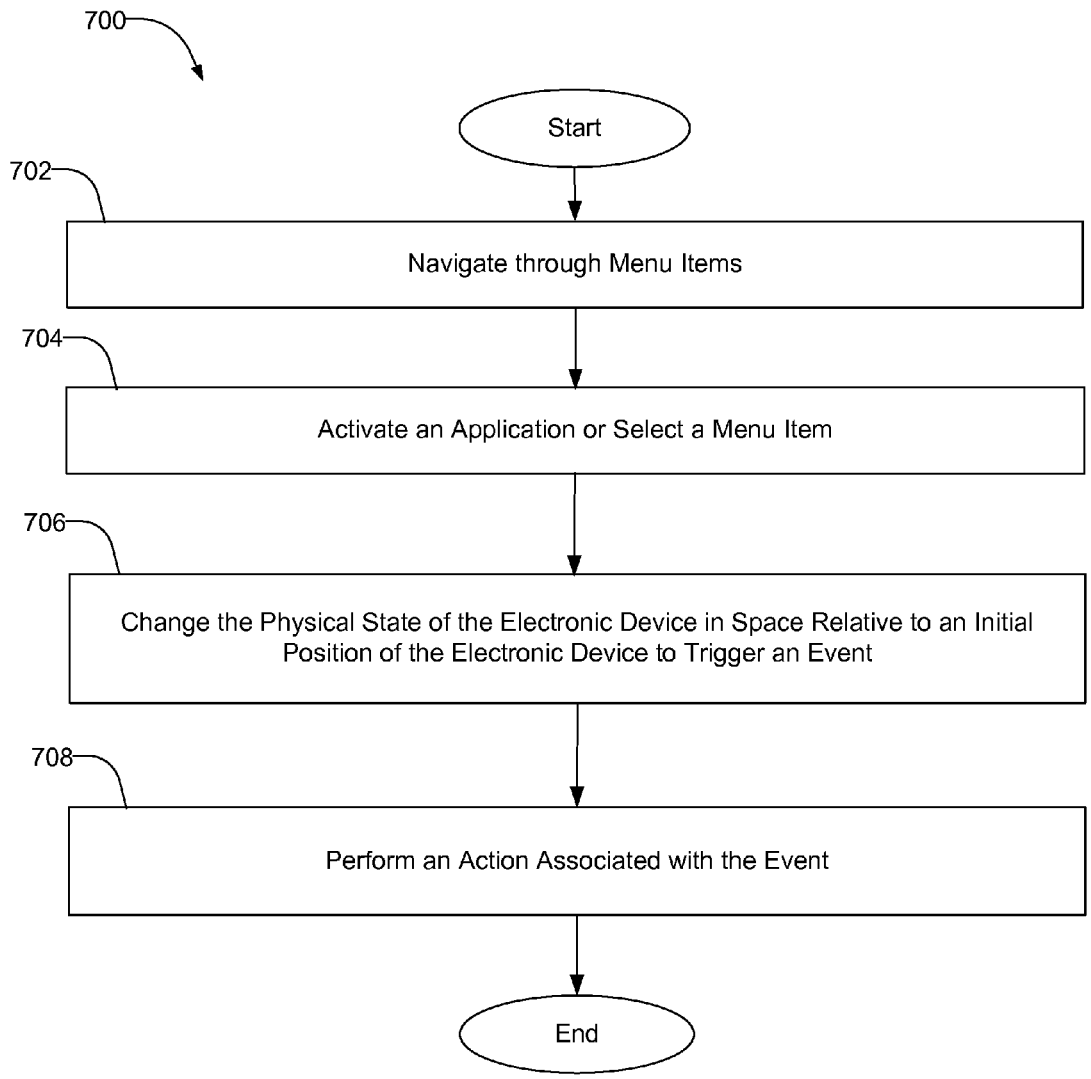
FIG. 7 is a flowchart of an example method to facilitate an input to the example portable electronic devices of FIG. 1, FIG. 2A, FIG. 2B, FIG. 5A, FIG. 5B, FIG. 5C, FIG. 5D, FIG. 6A and FIG. 6B.

FIG. 7 is a flowchart illustrating an example method 700 that may be used to trigger an event or facilitate or initiate an input field (e.g., the input fields 224b, 306b, 402-412, 628b or instances 514, 536) associated with a selected menu item, application or event notification (e.g., the menu items 222b, 306a, 222b-222f, 414, 510, 530, 628a) without having to navigate through one or more other menu items to select the desired input field. While an example manner of initiating an input field of the example electronic device 100, 600 has been illustrated in FIG. 7, one or more of the steps and/or processes illustrated in FIG. 7 may be combined, divided, re-arranged, omitted, eliminated and/or implemented in any other way. Further still, the example method of FIG. 7 may include one or more processes and/or steps in addition to, or instead of, those illustrated in FIG. 7, and/or may include more than one of any or all of the illustrated processes and/or steps. Further, although the example method is described with reference to the flow chart illustrated in FIG. 7, many other methods of initiating an input field or instances of the electronic device 100, 600 of FIGS. 1, 2A, 2B, 5A-5D, 6A and 6B may alternatively be used.

To begin the example process of FIG. 7, a user navigates through a menu item or icon representative of an application or event notification when the electronic device 100, 600 is in the first physical state (e.g., the closed position 202, 602, the position 502) (block 702). For example, a user may navigate through menu items or icons 222a-f, 306a, 626 using, for example, the auxiliary input 212, 630a. Furthermore, a user can select a menu item presented in the home screen state 221, 626 or a user can navigate to the single application dedicated level 302, 510 to select the menu item or box 306a, 522, 524 presented in the single application dedicated level 302, 510.

A user activates an application or selects the particular menu item or icon representative of an application or event notification (block 704). After selection of the menu item or icon, the user then alters or changes a physical state of the electronic device 100, 600 in space relative to an initial position to trigger an event or convenience key (block 706). For example, the physical state of the electronic device 100, 600 is altered when the housing 206, 606 is moved between the closed position 202, 602 and the open position 204, 604 or the housing 206, 606 is rotated between the positions 502 and 506. In particular, a user moves, flips, slides or rotates the housing 206, 606 of the electronic device 100, 600 to automatically initiate an input field (e.g., a preselected or predetermined input prompt) or display instances associated with the selected menu item or application (block 706). Thus, a user does not have to navigate through menu items, drop-down menus, icons, etc. to initiate an input field associated with the selected application or event notification. Instead, a user inputs a command or information via the input field associated with the selected application or event notification that is initiated or presented to the user when the physical state of the electronic device 100, 500 has been altered (block 708). The electronic device 100 communicates the inputted information to the active application associated with the input field.

Figure 8:
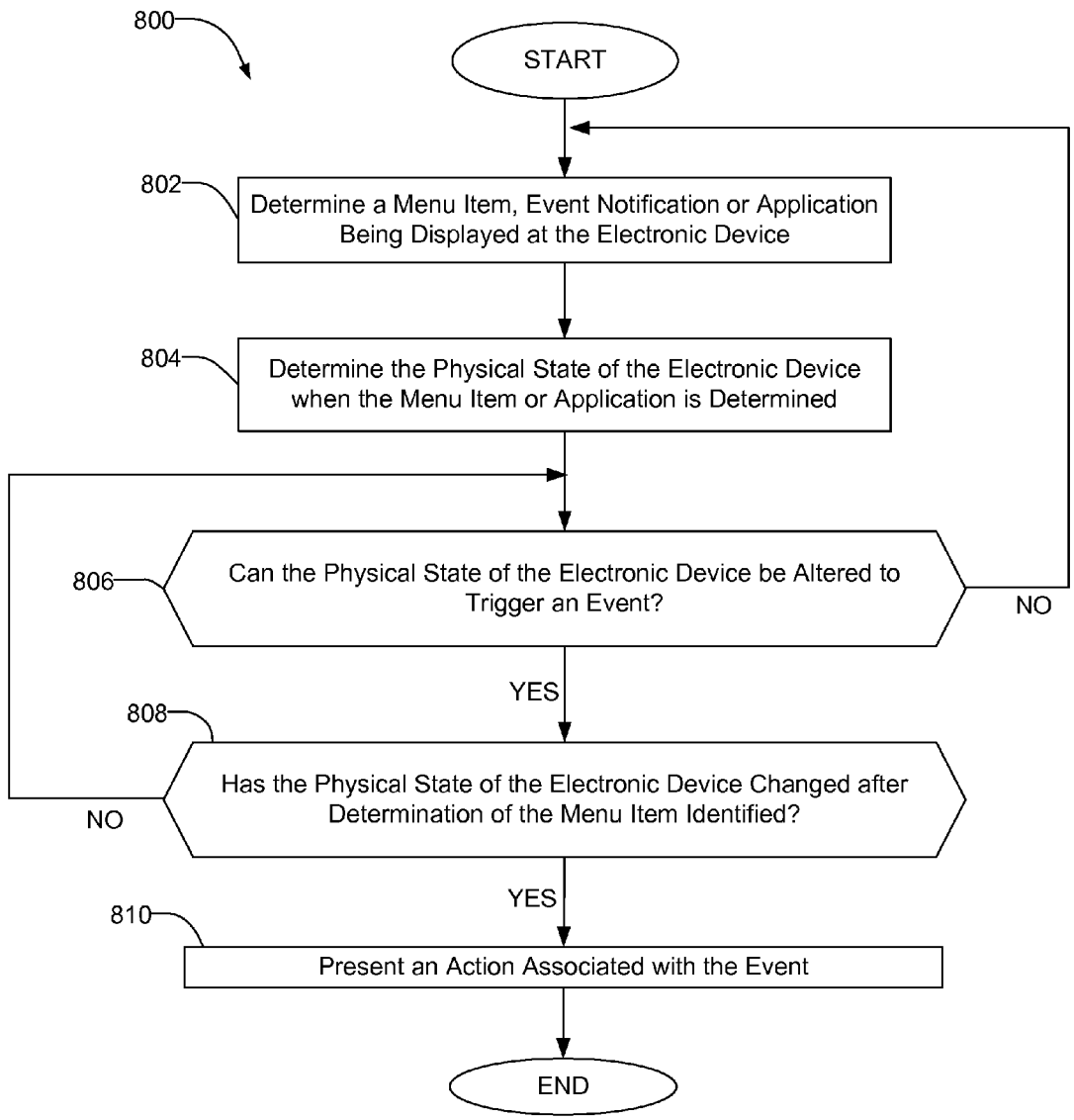
FIG. 8 is a flowchart representative of an example process that may be carried out by machine readable instructions that may be executed to facilitate an input to the example portable electronic devices of FIG. 1, FIG. 2A, FIG. 2B, FIG. 5A, FIG. 5B, FIG. 5C, FIG. 5D, FIG. 6A and FIG. 6B.

FIG. 8 is a flow diagram illustrating an example process that can be carried out by machine readable instructions 800 which may be executed to trigger an event or initiate an input field based on a change in a physical state of the electronic device 100, 600 (e.g., when the electronic device 100, 600 is moved between the closed position 202, 602 and the open position 204, 604, and/or is rotated between the position 502 and the position 506). While an example system 800 has been illustrated in FIG. 8, one or more of the steps and/or processes illustrated in FIG. 8 may be combined, divided, re-arranged, omitted, eliminated and/or implemented in any other way. Further still, the example system of FIG. 8 may include one or more processes and/or steps in addition to, or instead of, those illustrated in FIG. 8, and/or may include more than one of any or all of the illustrated processes and/or steps. Further, although the example system is described with reference to the flow chart illustrated in FIG. 8, many other methods of initiating a command prompt of the electronic device 100, 600 of FIGS. 1, 2A, 2B, 5A-5D, 6A and 6B may alternatively be used.

Referring to FIG. 8, the system 800 determines or identifies a selected menu item or icon (e.g., the menu items 222b, 222a-222f, 510, 628a, etc.) representative of an application or an event notification being displayed at the electronic device 100, 600 (block 802). For example, the menu item may be displayed via the GUI 218, 620 on the touch screen display 118 or the secondary display 610. In some examples, an application may be displayed via the GUI 218, 620 in a single application dedicated level. For example, the electronic device 100, 600 determines or identifies the user activated application or selected menu item at block 704 of FIG. 7.

After the system 800 determines the selected menu item identified, the system 800 determines or detects a physical state of the electronic device 100, 600 when the menu item, event notification or application is determined (block 804). For example, the electronic device 100, 600 detects if the housing 206, 606 of the electronic device 100, 600 is in the closed position 202, 602 and/or the orientation or position 502 when the determination of the selected menu item is identified or determined at block 804. In other words, the system 800 senses whether the housing 206, 606 of the electronic device 100, 600 is in the open position 204, 604 or the closed position 206, 606 and/or whether the electronic device 100, 600 is in the position 502 or the position 506.

For example, the system 800 may receive a signal from the sensor or switch 223 to determine if the housing 206 is in the open position 204 or the closed position 202. Additionally or alternatively, the system 800 may receive a signal from the accelerometer 134 and/or the gyroscope 136 to determine the orientation or position of the housing 206, 606.

The system 800 then determines if the physical state of the electronic device 100, 600 can be altered to trigger an event when the menu item or application is determined at block 804 (block 806). For example, the physical state of the electronic device 100, 600 can be altered to trigger an event when the system 800 detects that the housing 206, 606 of the electronic device 100, 600 is in the closed position 202, 602 and/or in the orientation or position 502 of FIG. 5A.

If the system 800 detects that the physical state of the electronic device 100, 600 cannot be altered to trigger an event, then the system 800 returns to block 802 (block 806). For example, if the housing 206, 606 of the electronic device 100, 600 is not in the closed position 204, 604 and/or not in the position 502 when the system 800 determines the selected menu item identified at block 806, then the system 800 returns to block 802.

If the system 800 detects that the physical state of the electronic device 100, 600 can be altered to trigger an event, then the system 800 monitors or detects whether the physical state of the electronic device 100, 600 has moved, changed, or otherwise been altered after determination of the menu item or application identified by the system 800 at block 804 (block 808). For example, the electronic device 100, 600 detects when the user moves, flips, rotates or slides the housing 206, 606 of the electronic device 100, 600 from the closed position 202, 602 to the open position 204, 604, and/or from the position 502 to the position 506 at block 706 of FIG. 7.

If the system 800 detects that the housing 206, 606 of the electronic device 100, 600 is not moved to the open position 204, 604 and/or the electronic device 100, 600 is not rotated to the position 506, then the system 800 returns to block 806 (block 808).

If the system 800 detects that the physical state of the electronic device 100, 600 has changed (block 808), then the system 800 triggers an event and presents an action associated with the event (block 810). For example, if the system 800 detects that the housing 206, 606 of the electronic device 100, 600 is in the open position 204, 604, then the system 800 initiates or presents an input field (e.g., the input fields 224b, 402-412, and 628b, instances 514, 536) associated with the selected menu item identified by the electronic device 100, 600 (block 810). The system 800 triggers an event and presents the input field to enable a user to perform an action or input a command or other information to the electronic device 100, 600 without having to navigate through menu items to locate or select the desired input field. For example, the system 800 may receive a user input or information from block 708 of FIG. 7. The system 800 communicates information inputted via the input field to the application or event notification associated with the input field. In other examples, the system 800 presents a plurality of tabs or icons 514, 536 representative of active or opened instances of the user selected application 510 and/or representative of active applications 530 when the electronic device 100, 600 is moved between the positions 502 and 506 to enable a user to quickly switch between a plurality of open or active instances and/or applications.

Figure 9:
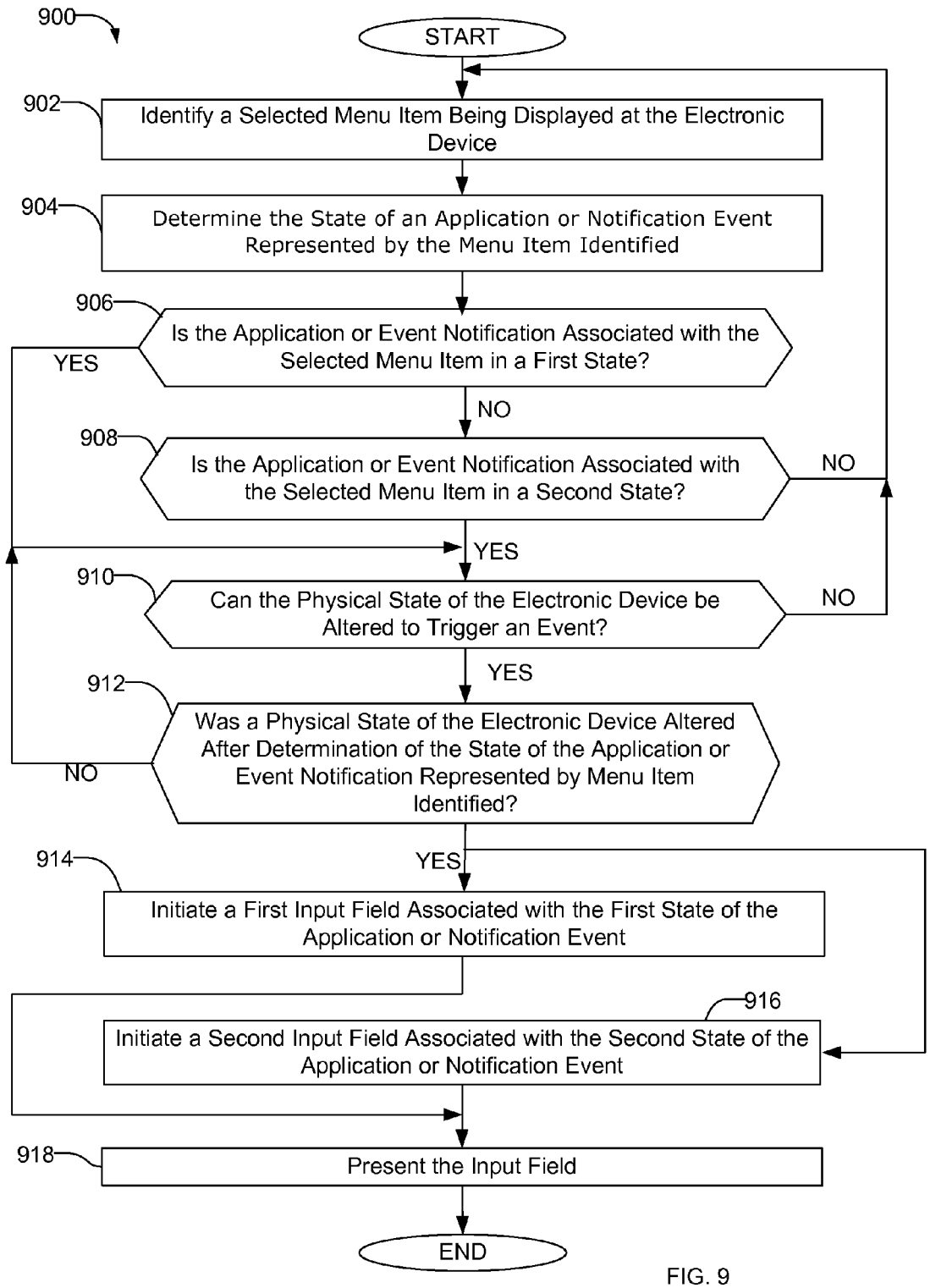
FIG. 9 is a flowchart representative of an example process that may be carried out by machine readable instructions that may be executed to facilitate an input to the example portable electronic devices of FIG. 1, FIG. 2A, FIG. 2B, FIG. 5A, FIG. 5B, FIG. 5C, FIG. 5D, FIG. 6A and FIG. 6B based on a state of an application or notification event represented by a selected menu item.

Additionally, in some examples, in addition to detecting the physical state of the electronic device, 100, 600, the example system 800 may also determine the state of an application or event notification via, for example, process 900 of FIG. 9.

FIG. 9 is a flow diagram illustrating an example process that can be carried out by machine readable instructions which may be executed to trigger an event or initiate an input field based on a state of an application represented by the selected menu item or icon when a physical state of the electronic device 100, 600 has changed (e.g., the housing 206, 606 is moved between the closed position 202, 602 and the open position 204, 604 and/or is rotated between the positions 502 and 506). While an example system 900 has been illustrated in FIG. 9, one or more of the steps and/or processes illustrated in FIG. 9 may be combined, divided, re-arranged, omitted, eliminated and/or implemented in any other way. Further still, the example system of FIG. 9 may include one or more processes and/or steps in addition to, or instead of, those illustrated in FIG. 9, and/or may include more than one of any or all of the illustrated processes and/or steps. Further, although the example system is described with reference to the flow chart illustrated in FIG. 9, many other methods of initiating a command prompt of the electronic device 100, 600 of FIGS. 1, 2A, 2B, 5A-5D, 6A and 6B may alternatively be used.

Referring to FIG. 9, the system 900 detects or identifies a selected menu item or icon (e.g., the menu items 222a-222f, 304, 628a, etc.) representative of an application (e.g., the application 510) or event notification being displayed at the electronic device 100, 600 (block 902). For example, the electronic device 100, 600 identifies the user selected menu item at block 704 of FIG. 7.

The system 900 then determines a state of the application or event notification represented by the selected menu item identified (block 904). For example, the system 900 can detect selection of either the menu item 222b of FIG. 2A, the menu item 306a of FIG. 2A or the application 510 when a user selects a menu item at block 704 of FIG. 7.

The system 900 then detects if the application or notification event associated with the selected menu item is in a first state (e.g., the home screen state 624, the cursor 520 of the application 510 being located in the "text" field 522, etc.) (block 906). If the system 900 detects that the application or notification event associated with the selected menu item is not in a first state at block 906, then the system 900 detects if the application or notification event associated with the selected menu item is in a second state (e.g., the single application dedication level 302, the cursor 520 of application 510 being located in the "to sender" field 524, etc.) (block 908). If the system 900 detects that the application or notification event is not in the second state at block 908, then the system returns to block 902.

After the system 900 determines that the state of the application or notification event represented by the selected menu item identified at block 904 is in the first state or the second state at blocks 906 and 910, respectively, the system 900 detects if the physical state of the electronic device 100, 600 can be altered to trigger an event (block 912). In some examples, the physical state of the electronic device 100, 600 can be altered if the housing 206, 606 of the electronic device 100, 600 is in the closed position 202, 602 and/or the housing 206, 606 is in position 502 when the state of the application is identified at block 904 (block 910). The system 900 senses whether the housing 206, 606 of the electronic device 100, 600 is in the open position 204, 604, the closed position 202, 602, the position 502 and/or the position 506. For example, the system 900 may receive a signal from a sensor or switch (e.g., the switch 223) to determine if the housing 206, 606 is in the open position 204, 604 or the closed position 202, 602, and/or may receive a signal from the accelerometer 134 and/or the gyroscope 136 to detect movement of the housing 206, 606 between the positions 502, 506.

If the system 900 detects that the physical state of the electronic device 100, 600 cannot be altered to trigger an event at block 910, then the system 900 returns to block 902 (block 910).

If the system 900 detects that the physical state of the electronic device 100, 600 can be altered at block 910 (e.g., the electronic device 100, 600 is in the closed position 202, 602 and/or the position 502), then the system 900 monitors or detects whether the housing 206, 606 of the electronic device 100, 600 is moved to the open position 204, 604 and/or the position 506 after determination of the state of an application represented by the menu item at blocks 906 and 908 (block 912). For example, the electronic device 100, 600 detects when the user moves, flips, rotates or slides the housing 206, 606 of the electronic device 100, 600 to the open position 204, 604 and/or a user rotates the electronic device 100, 600 to the position 506 at block 706 of FIG. 7.

If the system 900 determines that the state of the application or notification event selected is in the first state at block 906 when the housing 206, 606 is moved from the closed position 202, 602 to the open position 204, 604 and/or rotated from the position 502 to the position 506, then the system 900 initiates a first input field (e.g., the input fields 224b, 402-412, 528b, or fields 514, 530, 536) associated with the first state of the application or notification event represented by the selected menu item or application identified by the electronic device 100 at block 902 (block 914). The system 900 then presents the first input field (block 918). The system 900 presents the first input field to enable a user to input a command or other information to the electronic device 100, 600 without having to navigate through menu items to locate or select the first input field. For example, a user may select between a plurality of open programs, instances or applications represented by icons or tabs.

If the system 900 determines that the application or event notification represented by the selected menu item is in the second state at block 908 when the housing 206, 606 is moved to the open position 204, 604 and/or rotated to the position 506, then the system 900 initiates a second input field (e.g., the input field 306b, the list of contacts 526) associated with the second state of the application or notification event represented by the selected menu item (e.g., the menu item 306a) (block 916). The system 900 then presents the second input field (block 918). The system 900 presents the second input field to enable a user to input a command or other information to the electronic device 100, 600 without having to navigate through menu items to locate or select the second input field.

For example, a first input field presented by the electronic device 100, 600 at block 918 may be the example input field 224b of FIG. 2B when the system 900 determines that the menu item 224b of FIG. 2A is selected from the home screen state 221, and the second input field presented at block 918 may be the example input field 306b of FIG. 3B when the system 900 determines that the menu item 306a is selected from a single application dedicated level 302 in FIG. 3A. The system 900 communicates the information inputted to either the first or second input fields to the application associated with the first and second input fields.

In some examples, a first input field presented by the electronic device 100, 600 at block 918 may be the example instances 514 of FIG. 5C when the system 900 determines that the application 510 of FIG. 5A is a first state such that the cursor 520 is located in text field 522 when the electronic device 100, 600 is rotated between the positions 502 and 506. The second input field presented by the electronic device 100, 600 at block 918 may be the list of contacts 526 when the system 900 determines that the application 510 of FIG. 5A is in a second state such that the cursor 520 of the application 510 is located in the "to sender" field 524 to enable a user to scroll and select desired contacts 526 when the electronic device 100,600 is rotated to the position 506.

The methods described herein may be carried out by software executed, for example, by the processor 102. Coding of software for carrying out such a method is within the scope of a person of ordinary skill in the art given the present description. A computer-readable medium having computer-readable code may be executed by at least one processor of the portable electronic device 100 to perform the methods described herein.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method for facilitating an input to an electronic device, the method comprising:
   presenting a menu item for selection while the electronic device is in a first orientation, wherein the menu item corresponds to an application;
   detecting a first instance and a second instance associated with the application that are running or active when the electronic device is in the first orientation, the first instance being different than the second instance;
   displaying only the first instance of the application when the electronic device is in the first orientation;
   detecting that the electronic device in a second orientation different than the first orientation; and
   displaying a first icon representative of the first instance and a second icon representative of the second instance in response to detecting the electronic device moving from the first orientation to the second orientation when the first instance of the application is displayed in the first orientation.

2. The method of claim 1, wherein the first orientation comprises the electronic device being in a portrait orientation and the second orientation comprises the electronic device being in a landscape orientation.

3. The method of claim 1, further comprising detecting a cursor location when the first application is in a single application dedicated level and the electronic device is in the first orientation.

4. The method of claim 3, further comprising displaying the first and second icons representative of the first and second instances when the cursor is detected in a first location or field input of the first instance of the application when the electronic device is in the first orientation prior to the electronic device being moved to the second orientation.

5. The method of claim 1, further comprising processing a signal provided by an accelerometer to determine if the electronic device is in the first orientation or a vertical orientation and in the second orientation or a horizontal orientation.

6. The method of claim 1, wherein the application comprises an internet browser application and the first and second icons presented when the electronic device is in the second orientation are representative of respective first and second active web pages of the internet browser application.

7. The method of claim 1, wherein the application comprises an instant message application and the first and second icons presented when the electronic device is in the second orientation are representative of respective first and second active instant messages.

8. The method of claim 1, wherein the application comprises an email application and the first and second icons presented when the electronic device is in the second orientation are representative of respective first and second active email messages.

9. The method of claim 1, further comprising enabling selection of the first and second icons representative of the respective first and second instances when the electronic device is in the second orientation.

10. The method of claim 9, further comprising identifying selection of the second icon representative of the second instance when the electronic device is in the second orientation.

11. The method of claim 10, further comprising detecting the electronic device being rotated from the second orientation to the first orientation after selection of the second icon when the electronic device is in the second orientation.

12. The method of claim 11, further comprising displaying only the second instance in a single application dedicated level in response to detecting the electronic device being rotated from the second orientation to the first orientation.

13. The method of claim 1, further comprising displaying a third icon representative of a second application when the electronic device is in the second orientation, wherein the second application is active but not displayed when the electronic device is in the first orientation.

14. A method for facilitating an input to an electronic device comprising:
    detecting a first application and a second application that are running or active when the electronic device is in a portrait orientation;

displaying only the first application when the electronic device is in a portrait orientation; and displaying for selection a first icon representative of the first application and a second icon representative of the second application in response to detecting a housing of the electronic device being moved from the portrait orientation to a landscape orientation when the first application is displayed in the portrait orientation.

15. The method of claim 14, wherein detecting whether the housing of the electronic device is in the portrait orientation or the landscape orientation comprises processing a signal provided by an accelerometer to detect whether the housing is rotated.

16. The method of claim 14, further comprising determining a state of the first application when the electronic device is in the portrait orientation.

17. The method of claim 16, wherein determining the state of an application comprises determining whether the first application being presented is in a single application dedicated level when the electronic device is in the portrait orientation.

18. The method of claim 17, further comprising detecting whether a cursor is in a "text" field and detecting whether the cursor is in a "to sender" field when the first application is in the single application dedicated level prior to displaying the first and second icons representative of the respective first and second applications in response to detecting the electronic device being moved to the landscape orientation.

19. The method of claim 18, further comprising displaying the first and second icons representative of the first and second applications when the cursor is detected in the "text" field when the first application is displayed in the portrait orientation.

20. The method of claim 14, further comprising enabling selection between the first icon representative of the first application and the second icon representative of the second application when the electronic device is in the landscape orientation.

21. The method of claim 20, further comprising identifying the second icon representative of the second application selected when the housing is in the landscape orientation.

22. The method of claim 21, further comprising displaying only the second application in a single application dedicated level in response to detecting the housing being moved from the landscape orientation to the portrait orientation, wherein the first application is running or active and not displayed when the housing is moved from the landscape orientation to the portrait orientation.

23. The method of claim 14, further comprising displaying a third icon representative of a first instance associated with the first application that is active and running and a fourth icon representative associated with a second instance of the first application that is active and running when the first icon representative of the first application is highlighted or selected when the electronic device is in the landscape orientation.

24. The method of claim 23, further comprising displaying a fifth icon representative of a third instance associated with the second application that is active and running and a sixth icon representative of a fourth instance associated with the second application that is active and running when the second icon representative of the second application is highlighted or selected when the electronic device is in the landscape orientation.

25. The method of claim 14, further comprising identifying a selection of sixth icon representative of the fourth instance of the second application and displaying the fourth instance of the second application in a single application dedicated level in response to detecting the electronic device from the landscape orientation to the portrait orientation.

26. The method of claim 23, further comprising displaying the first and second icons representative of the respective first and second applications on a first row and displaying the third, fourth, fifth and sixth icons representative of the respective first, second, third and fourth instances on a second row different than the first row.

27. The method of claim 26, further comprising displaying only the third and fourth icons representative of the respective first and second instances in the second row when the first icon representative of the first application is selected or highlighted when the electronic device is in the landscape orientation.

28. The method of claim 27, further comprising displaying only the fifth and sixth icons in the second row representative of the respective third and fourth instances when the second icon representative of the second application is selected or highlighted when the electronic device is in the landscape orientation.

29. A non-transitory computer-readable medium comprising instructions that, when executed, cause a machine to:

present a menu item for selection when an electronic device is in a first orientation, wherein the menu item corresponds to an application;

detect a first instance and a second instance associated with the application that are running or active when the electronic device is in the first orientation;

display only the first instance of the application when the electronic device is in the first orientation;

detect the electronic device in a second orientation different than the first orientation; and display a first icon representative of the first instance and a second icon representative of the second instance in response to detecting the electronic device moving from the first orientation to the second orientation when the first instance of the application is displayed in the first orientation.

30. The non-transitory computer-readable medium as defined in claim 29 comprising instructions that, when executed, cause a machine to detect the first orientation of the electronic device and detect the second orientation of the electronic device.

31. The non-transitory computer-readable medium as defined in claim 29 comprising instructions that, when executed, cause a machine to detect proximity of cursor location when the application is in a single application dedicated level and the electronic device is in the first orientation.

32. The non-transitory computer-readable medium as defined in claim 31 comprising instructions that, when executed, cause a machine to display the first icon and the second icon in response to detecting the cursor being in a first location or input field when the electronic device is in the first orientation prior to detecting movement of the electronic to the second orientation.

33. The non-transitory computer-readable medium as defined in claim 29 comprising instructions that, when executed, cause a machine to identify selection of the second icon representative of the second instance when the electronic device is in the second orientation and detect the electronic device being rotated to the first orientation after selection of the second icon while the electronic device is in the second orientation.

34. The non-transitory computer-readable medium as defined in claim 33 comprising instructions that, when executed, cause a machine to display the second instance in a single application dedicated level in response to detecting the electronic device being moved to the first orientation after identifying selection of the second icon when the electronic device is in the second orientation.

\* \* \* \* \*